Oct. 23, 1956
H. A. LONG
2,767,725
PRESSURE RATIO REGULATOR
Filed June 22, 1953
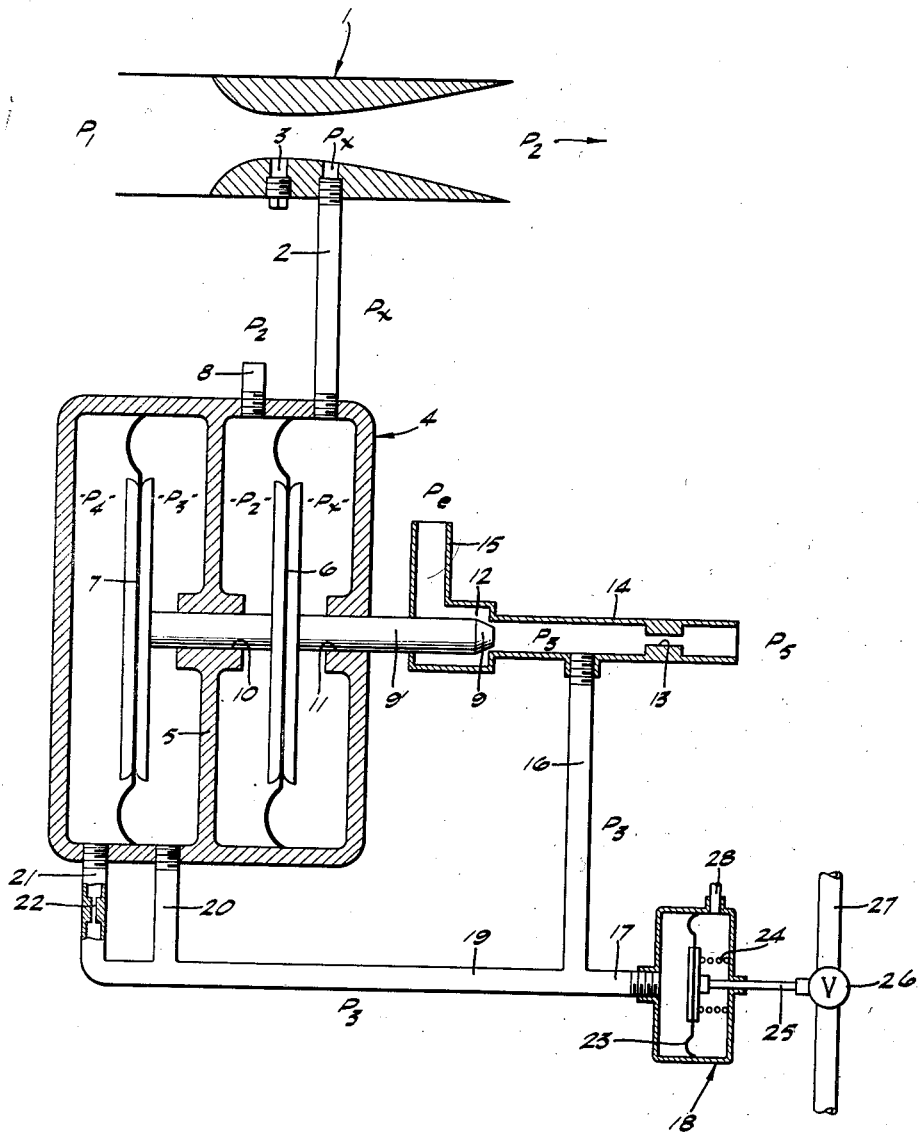
INVENTOR.
HENRY A. LONG
BY R. E. Geauque
ATTORNEY.

United States Patent Office 2,767,725
Patented Oct. 23, 1956

2,767,725

PRESSURE RATIO REGULATOR

Henry A. Long, Van Nuys, Calif., assignor to Marquardt Aircraft Company, Van Nuys, Calif., a corporation of California Application June 22, 1953, Serial No. 363,144

7 Claims. (Cl. 137—86)

This invention relates to a pressure ratio regulator and, more particularly, to a pressure ratio regulator with a proportional plus integral transfer function for controlling the pressure ratio of a system having an appreciable inertia.

The proposed regulator generates an output signal in proportion to the error of the pressure ratio and to the integral of this error. It has been the practice in pressure regulators to maintain a constant pressure differential across a regulator for control purposes so that the output signal is proportional only to error of the pressure ratio. Also, proportional plus integral computers have been utilized in hydraulic systems, such as governors, in order to give an immediate response to error which is corrected by the time integral of this error.

The present invention is applicable to regulators using compressible fluids, and by using a moderate volume and a short length of capillary tubing for the resistance, a relatively long integral time constant can be produced. This feature makes it practical to obtain integral time constants appreciably longer than those easily attainable from systems using an incompressible fluid and a restriction for integrating. By the present invention, maximum response can be obtained to error in the regulated pressure ratio with a minimum steady stated error. Also, the integral time constant tends to increase with increasing altitude, which compensates for time constant changes with altitude of turbojet and ramjet engines.

It is, therefore, an object of the present invention to provide a pressure ratio regulator which provides an output signal proportional to pressure ratio error and to the integral of this error.

Another object of the invention is to provide means for obtaining a relatively long integral time constant by utilizing a moderate volume of flow through a short length of resistance.

A still further object of the invention is to provide a pressure ratio regulator which is responsive to any two pressures of compressible fluid from which an output signal is derived and which gives maximum response with a minimum steady state error.

A still further object of the invention is to provide an integral time constant which increases with increasing altitude when atmospheric pressure is one of the measured pressures.

These and other objects of the invention, not specifically enumerated above, will be readily apparent to those skilled in the art from the accompanying description and drawing, in which the output of the pressure ratio regulator is illustrated as controlling a valve, but it is understood that the output can be connected to any other type of control device.

Referring to the drawing, a venturi or Laval nozzle 1 is illustrated as having an inlet pressure $P_1$ and an outlet pressure $P_2$. A static pressure pick-up line 2 is connected to a position in the nozle in order to sense a pressure $P_x$ which is a fixed fraction of the pressure $P_1$. The static pick-up line 2 is positioned in the nozzle so that the ratio $P_x/P_1$ is the reciprocal of the selected value of the pressure ratio $P_1/P_2$, which is the pressure ratio to be regulated. In other words, the desired ratio to be maintained between $P_1$ and $P_2$ can be selected and then a connection can be made to the nozzle 1 so that $P_x/P_1$ is the reciprocal of this selected ratio. A second static pick-up line 3 is shown in the figure to illustrate that $P_x$ could be obtained from line 3 rather than line 2 if a different ratio of $P_1/P_2$ were selected. With supersonic flow through the nozzle, the static pressure at any pick-up station in the nozzle is related to pressure $P_1$ as a unique function of the ratio of the area at the station to the area at the nozzle throat.

A casing 4 has a partition 5 to provide two fluid-tight spaces for diaphragms 6 and 7. The pressure $P_x$ is introduced to one side of diaphragm 6 from line 2 while pressure $P_2$ is introduced to the other side of this same diaphragm from line 8. It is understood that the pressures $P_1$ and $P_2$ can represent any two pressures, the ratio of which is utilized to regulate a quantity, such as fuel flow to an engine or gas flow to a cooker in a chemical process. Thus the invention is not limited to any particular use but can be utilized in any system to regulate a quantity in response to two pressures and, of course, is most applicable to systems having appreciable inertia. For instance, in turbojet and ramjet applications, the pressures $P_1$ and $P_2$ can represent some selected critical pressures within the engine.

From the above discussion, the following equations result:

$$P_x = KP_1$$

where K is the fixed fraction of $P_1$ as measured at line 2. Also, $$P_1/P_x = \frac{1}{K} = (P_1/P_2) \text{ sel.}$$

where $(P_1/P_2)$ sel. represents the selected pressure ratio to be controlled. Then, $$P_x = \frac{P_1}{(P_1/P_2) \text{ sel.}}$$

and $$P_x - P_2 = \frac{P_2}{(P_1/P_2) \text{ sel.}} [(P_1/P_2) \text{ act.} - (P_1/P_2) \text{ sel.}]$$

where $(P_1/P_2)$ act. is the actual pressure ratio. Also, the error ($E_{pr}$) in pressure ratio is represented by $$E_{pr} = (P_1/P_2) \text{ act.} - (P_1/P_2) \text{ sel.}$$

and $$K = \frac{1}{(P_1/P_2) \text{ sel.}}$$

Therefore, $$P_x - P_2 = KP_2 E_{pr}$$

Hence, the diaphragm 6 senses the error in the regulated pressure ratio ($E_{pr}$).

A valve 9 is carried by an arm 9', which is rigidly fixed to both diaphragms 6 and 7 and is supported in fluid-tight openings 10 and 11 in partition 5 and casing 4, respectively. The valve 9 assumes a position, in valve chamber 12, which establishes the output pressure $P_3$ at a level necessary to balance the forces on the two diaphragms 6 and 7. The pressure $P_3$ is derived from pressure $P_5$ introduced through restriction 13 in line 14 which connects with valve chamber 12. The valve chamber in turn exhausts through line 15 to pressure $P_e$. It is apparent that any pressure can be utilized as $P_5 > P_3$ (max.) and $P_e < P_3$ (min.). The restriction 13 serves the purpose of damping out line variation in pressure $P_5$.

The output pressure $P_3$ is obtained from line 16 opening behind restriction 13 and line 16 connects with line 17 leading to the output regulator 18 and with line 19 which has a first branch 20 leading directly to one side of diaphragm 7 and a second branch 21 leading to the other side of diaphragm 7 through a restriction 22. It is therefore apparent that the pressure $P_4$ in the diaphragm chamber which is fed through the restriction 22 follows the output pressure $P_3$ with a first order lag and since the other side of diaphragm 7 is exposed directly to the output pressure $P_3$, the force applied by diaphragm 7 is proportional to the integral of the output force $P_3$. Hence, the force balance on the two diaphragms 6 and 7 can be maintained only if the output pressure is proportional to the error $E_{pr}$ on diaphragm 6 and to the integral of the output force on diaphragm 7. Therefore, the output pressure is proportional to the error in pressure ratio and to the integral of this error.

From the above discussion, the following equations result:

$$P_4 = P_3 \left(\frac{1}{1+\tau S}\right)$$

where $$\left(\frac{1}{1+\tau S}\right)$$

is the first order time lag, $\tau$ being the time constant determined by the size of orifice 22 and volume for pressure $P_4$, and $S$ the usual symbol for differentiation with respect to time.

Also, the force balance equation for the two diaphragms 6 and 7 can be written:

$$A_2(P_4 - P_3) = A_1(P_x - P_2)$$

where $A_1$ and $A_2$ represent the effective areas of diaphragms 6 and 7 respectively. By substituting for $P_4$ and $(P_x - P_2)$, the force balance equation becomes:

$$P_3 = K P_2 \frac{A_1}{A_2} E_{pr} \left[1 + \frac{1}{\tau S}\right]$$

This equation then represents that $P_3$ will be proportional to the error $E_{pr}$ in pressure ratio and to the integral of this error $$\frac{E_{pr}}{\tau S}$$

In operation, should $P_x$ increase, the error in pressure ratio would act on diaphragm 6 in a direction to open valve 9 in order to adjust $P_3$ to correct the pressure ratio back to the selected ratio of $P_1/P_2$. However, the movement of valve 9 will not be directly proportional to the pressure error since the pressure $P_3$ will drop when the valve is opened and cause a differential pressure on diaphragm 7 opposed to the force on diaphragm 6. This differential pressure on diaphragm 7 results because of the fact that $P_4$ follows $P_3$ with a first order lag because of restriction 22. Thus, the forces on the two diaphragms will become balanced only when the output pressure $P_3$ is proportional to the error in pressure ratio $E_{pr}$ and to the time integral of this error. Of course, when $P_x$ decreases, the same sort of adjustment takes place so that $P_3$ does not directly follow the error in pressure ratio. This type of regulation is desirable with a system having an appreciable inertia, since it will give the maximum response available in the system without instability and will give a minimum steady state error because of the time lag in response. Of course, if the error in pressure ratio persists for a sufficient time, the correction in the position of valve 9 will be proportional to this error since pressure $P_4$ will become equal to the pressure $P_3$ and diaphragm 7 will cease to exert a pressure on the valve. A relatively long integral time constant can be obtained because of the moderately large volume for pressure $P_4$ and the short length of resistance 22.

The pressure $P_3$ in line 17 acts against one side of diaphragm 23 in output regulator 18 while spring 24 acts against the other side of the diaphragm which is connected to atmosphere through passage 28. The arm 25 is rigidly secured to diaphragm 23 and connects with the valve 26 in line 27 to regulate the flow through this passage to give an output proportional to the error in pressure ratio and to the integral of this error.

Thus, by the present invention, a desired pressure ratio can be selected and the pressure regulator will give a proportional plus integral transfer function. Since the pressure $P_3$ is proportional to $P_2$, it is possible, when $P_2$ is taken as the atmospheric pressure, to have the integral time constant increase with increasing altitude which compensates for time constant changes with altitude of any engine utilizing air from the atmosphere, such as turbojet, pulsejet and ramjet engines. This is apparent from the last equation, wherein it can be shown that the integral time constant will vary as $\tau/P_2$. As previously pointed out, the pressure ratio regulator can be utilized in any type of system in which it is desired to maintain a selected ratio between two pressures and the output signal can be utilized to operate any selected control unit. Various modifications of the invention are contemplated and may obviously be resorted to by those skilled in the art without departing from the spirit and scope of the invention as herein defined in the appended claims.

What is claimed is:

1. A pressure ratio regulator for controlling the pressure ratio between two pressures of compressible fluid, comprising a diaphragm having one of said two pressures on one side and a pressure proportional to the other of said two pressures on the other side, said diaphragm developing a first force proportional to the difference between the selected pressure ratio and the actual pressure ratio, means for deriving said proportional pressure comprising a venturi nozzle receiving said other pressure and a static pressure outlet in the throat of said nozzle for obtaining said proportional pressure, said outlet being so located that the ratio of said proportional pressure to said other pressure is the reciprocal of the selected pressure ratio, means for producing a second force proportional to the integral of said difference and means for combining said forces to produce an output signal proportional to said difference and to the integral of said difference.

2. A pressure ratio regulator for controlling the pressure ratio between two pressures at a selected value, comprising a first diaphragm having one of said two pressures on one side and a pressure proportional to the other of said two pressures on the other side, means for varying said proportional pressure in accordance with the selected pressure ratio comprising a venturi nozzle receiving the said other pressure and having a series of outlets in the throat thereof for selecting a proportional pressure that results in the ratio of the proportional pressure to said other pressure being the reciprocal of the selected pressure ratio, said first diaphragm developing a first force proportional to the error between the selected pressure ratio and the actual pressure ratio, an output pressure signal controlling means connected to said first diaphragm for producing an output pressure signal, a second diaphragm having said output pressure signal connected to one side thereof and a first order lag of said output signal connected to the other side thereof, said second diaphragm developing a second force proportional to the integral of said error, and means for also connecting said output pressure signal controlling means to said second diaphragm so that the output signal will be proportional to said error and to the integral of said error.

3. A pressure ratio regulator for maintaining the pressure ratio between first and second pressures at a selected value, comprising means for obtaining a third pressure which is a selected fraction of said first pressure such that the ratio of said first pressure to said third pressure is equal to the selected ratio of said first pressure to said second pressure and means for comparing said third pressure with said second pressure to obtain a control force.

4. A pressure ratio regulator as defined in claim 3 wherein said means for obtaining said third pressure comprises a nozzle positioned between said first and second pressures and an opening in said nozzle positioned to receive said third pressure.

5. A pressure ratio regulator for maintaining the pressure ratio between first and second pressures at a selected value, comprising first means for obtaining a third pressure which is a selected fraction of said first pressure such that the ratio of said first pressure to said third pressure is equal to the selected ratio of said first pressure to said second pressure, second means for comparing said third pressure with said second pressure to obtain a first control force, an output signal controlling means connected to said second means for producing a control signal, third means for producing a signal representing a first order time lag of said control signal, fourth means for comparing said control signal with said lag signal to obtain a second control force, and fifth means for connecting said second and fourth means together to control said signal controlling means.

6. A pressure ratio regulator as defined in claim 5 wherein said output signal controlling means comprises a pressure source and valve means positioned in a passage connected with said pressure source, said control signal being the pressure derived from ahead of said valve means.

7. A pressure ratio regulator as defined in claim 6 wherein said third means comprises a restriction within a line connected with said pressure control signal so as to obtain a pressure representing a first order time lag of said pressure control signal.

References Cited in the file of this patent

UNITED STATES PATENTS

| | | |
|---|---|---|
| 2,505,981 | McLeod | May 2, 1950 |
| 2,628,086 | Cutler | Feb. 10, 1953 |
| 2,633,858 | Eckman | Apr. 7, 1953 |
| 2,712,321 | Grogan | July 5, 1955 |

FOREIGN PATENTS

| | | |
|---|---|---|
| 536,537 | Great Britain | May 19, 1941 |
| 568,634 | Great Britain | Apr. 13, 1945 |